2,973,389
FLUORINATED ORGANIC ETHERS

Klaus Weissermel, Frankfurt am Main, and Werner Starck, Hofheim, Taunus, Germany, assignors to Farbwerke Hoechst Aktiengesellschaft vormals Meister Lucius & Bruning, Frankfurt am Main, Germany, a corporation of Germany No Drawing. Filed July 22, 1958, Ser. No. 750,105

Claims priority, application Germany July 24, 1957

8 Claims. (Cl. 260—615)

The present invention relates to a process for preparing fluorinated organic ethers.

U.S. Patent 2,409,274 describes the manufacture of tetrafluoroethyl and chloro-fluoroethylalkyl ethers by adding an alcohol to tetrafluoroethylene or trifluorochloroethylene in the presence of a basic catalyst. Further addition reactions of primary and secondary alcohols with fluorinated olefins have been described in more recent publications (cf. J. H. Simons, "Fluorine Chemistry," volume II, Academy Press, Inc., New York, N.Y., P. Tarrant, pages 232–235, and J. H. Simons, T. J. Price, pages 236–238).

The reaction of a fluorinated olefin with an alcohol which is especially catalyzed by an alkali metal in the form of an alkali metal alcoholate, may be demonstrated by the following reaction equation:

$$CF_2=CX_2 + ROH \rightarrow ROCF_2-CX_2H$$

wherein X represents a halogen atom or a perhalogenoalkyl radical or a hydrogen atom.

In all previously known reactions of fluorinated olefins with alcohols to obtain the corresponding fluorinated ethers, alcohols have been used which are liquid or soluble in an inert organic solvent under the reaction conditions used.

All primary and secondary, monohydric or polyhydric alcohols of low or high molecular weight, which are solid under normal conditions or insoluble in any organic solvent suitable for the reaction, could not yet be added to fluorinated olefins by a known process to obtain the addition products in a satisfactory yield. In most cases these alcohols are polyfunctional and of low or high molecular weight, which, due to their polar character, are soluble to an appreciable extent only in water.

Nor could tertiary alcohols, such as tertiary butanol, be reacted in a known process in view of the fact that these alcohols have too poor a solubility in the organic solvents hitherto employed.

Now we have found that the aforesaid alcohols and other organic compounds containing hydroxylic groups, for example, unsaturated fatty alcohols, saturated or unsaturated cycloaliphatic alcohols or phenols, can be subjected to an addition reaction with a fluorinated alkylene with formation of ether, by carrying out the reaction in a water-like anhydrous solvent in the presence of a suitable basic catalyst.

As water-like, anhydrous solvent there may be used, for example anhydrous liquid ammonia.

We have also found that the addition reaction of compounds containing hydroxylic groups with fluorinated olefins in liquid ammonia in the presence of a suitable basic catalyst takes place very rapidly with a quantitative yield even at a temperature below −33° C.

A further advantage of the invention resides in that the reaction may partially be carried out at atmospheric pressure. Since in most cases polyhydric alcohols are better soluble in liquid ammonia than in water, it is possible to carry out the reaction using a higher concentration of dissolved alcohols.

For the reaction with fluorinated olefins according to this invention there may suitably be used those compounds containing hydroxylic groups which are either completely soluble in liquid ammonia or at least partially soluble in the form of an alcoholate, for example an alcoholate of an alkali metal or alkaline earth metal. In view of the fact that the solubility depends substantially on the solvent temperature which may vary within wide limits as stated hereinafter, it is not easy to indicate numerical data for the solubility properties the compounds must possess. It is however suitable to indicate that the lower solubility limit of the component containing hydroxylic groups or the alcoholate compound thereof should be at about 5% by weight at the reaction temperature applied, calculated upon the ammoniacal solution of the component containing hydroxylic groups.

As compounds of the type referred to above, there may be mentioned more especially: saturated or unsaturated, aliphatic monohydric or polyhydric, primary secondary or tertiary alcohols which are completely soluble in liquid ammonia, or at least partially soluble in the form of an alkali metal alcoholate or alkaline earth metal alcoholate. There may be named, for example: ethanol, propanol, butanol, isobutanol, hexanol, decanol, ethylene glycol, propylene glycol-(1,3) or propylene glycol-(1,2), glycerol, pentaerythrite, sugar alcohols containing 5 or 6 carbon atoms, such as sorbitol or mannitol, or allyl alcohol or propargylic alcohol. There may also be mentioned saturated or unsaturated, monohydric or polyhydric cycloaliphatic alcohols, such as cyclohexanol, cyclohexenol, or partially or completely hydrogenated naphthol. Further suitable compounds are monohydric or polyhydric aromatic substances containing hydroxylic groups, for example phenol, α- or β-naphthols or their nuclei-substituted alkyl compounds, such as cresols. These compounds are hydroxy-substituted hydrocarbons having up to ten carbon atoms. If the suitable representatives of the aforesaid series contain more than one hydroxylic group, these groups may be blocked except for one hydroxylic group, for example by esterification, etherification or cyanoethylation, provided that these compounds are completely soluble in liquid ammonia or at least partially soluble in the form of the corresponding alcoholates in accordance with the definition given above.

As fluoroalkylenes there may suitably be used compounds of the general formula

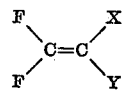

wherein X stands for a halogen atom with an atomic weight from 19 to 80 and Y stands for a hydrogen atom, a halogen atom with an atomic weight from 19 to 80 and a perhalogenated methyl radical which is perhalogenated by equal or different halogens with an atomic weight from 19 to 80. The following suitable compounds are mentioned by way of example: $CF_2=CCl_2$, $CF_2=CFCl$, $CF_2=CF_2$, $CF_2=CFH$, $CF_2=CClH$, $CF_2=CF-CF_3$. Apart from the aforesaid halogen-substituted fluoroalkylenes, there may also be used halogen-substituted fluorocycloalkylenes of the general formula $$\begin{array}{c} F_2\!-\!C\!-\!C\!-\!X \\ |\ \ \ || \\ F_2\!-\!C\!-\!C\!-\!Z \end{array}$$

wherein X represents a halogen atom with an atomic weight of 19 to 80 and Z a hydrogen atom or a halogen atom with an atomic weight of 19 to 80. Fluorinated olefins of high molecular weight which may be obtained by cracking fluorinated polymers, such as polytrifluorochloroethane, may also be used.

As basic catalysts there may be employed in this invention alcoholates or phenolates of an alkali meal or alkaline earth metal. The alkali metal components used have a molecular weight of 6.9 to 133, and the alkaline earth metal compounds of 40 to 138. It is advantageous to use at the alcohol component of the catalyst part of the alcohol or phenol used for the reaction. For this purpose, the solution of the alcohol or phenol concerned in liquid ammonia is admixed with either a solution of an alkaline earth metal or alkali metal or a mixture of these metals in liquid ammonia; the two solutions are combined and an alcoholate or phenolate is formed in an amount that corresponds to the quantity of metal admixed. To the combined solutions so obtained and containing the component with the hydroxylic groups and the catalyst, fluorinated olefin is then added dropwise. The alcoholate or phenolate which is intended to act as a catalyst may of course also be prepared separately from the metal and alcohol or phenol in liquid ammonia, and then added in such finished state to the ammoniacal substance containing hydroxylic groups. To produce the alcoholate or phenolate catalyst, there may be used, in addition to the metals aforesaid, any other alkali metal or alkaline earth metal compound which is capable of forming an alcoholate or phenolate with the hydroxylic compounds dissolved in liquid ammonia; in this case the alkali metal or alkaline earth metal compound may have an atomic weight as indicated above. There may be mentioned more especially: alkali metal alkyl compounds, such as methyl lithium, alkali metal amides or alkaline earth metal amides, such as sodium amide, or alkali metal acetylides, for example sodium acetylide. The compounds set free in reacting sodium acetylide with an alcohol or a phenol do not affect the course of the reaction. It is advantageous to convert into the alcoholate or phenolate 0.1–10% by weight, preferably 4–6% by weight of the total amount of hydroxylic compound participating in the reaction. Accordingly, a corresponding amount of the aforesaid metals or metal compounds is always used alone or in admixture with one another. The concentration in which the ammonia-dissolved metal or metal compounds are used may vary within wide limits, the upper limit of solubility being determined by the boiling point of liquid ammonia, provided that the reaction is carried out at atmospheric pressure. In selecting the metal components which are suitable as catalysts, is is advantageous to use the readily available alkali metals in a concentration of about 0.1–10% by weight calculated on the hydroxylic compound.

The reaction may also be carried out in an inert solvent, in which case after completion of the reaction and removal of the liquid ammonia, the reaction product is obtained in the dissolved state in the inert solvent used. Suitable inert solvents are saturated or unsaturated, straight chain or branched hydrocarbons, cycloaliphatic hydrocarbons, for example pentane, hexane, heptane, octane, cyclopentane or cyclohexane, dialkyl ethers, for example diethylether, or cyclic ethers, such as dioxane or tetrahydrofurane.

The reaction temperatures are at about −70° C. to −33° C. at atmospheric pressure (boiling point of liquid ammonia under normal conditions, i.e. at atmospheric pressure) and preferably at about −50° C. to about −35° C. or at −33° C. to about +100° C. under superatmospheric pressure. The temperature and pressure conditions to be observed when the reaction is carried out under superatmospheric pressure, are dependent, for example, on the solubility of the reactants and catalysts or on the various reactivity of the fluoro-olefins and the hydroxylic compounds, so that the optimum conditions must be determined for each individual case. The reaction takes sometimes a strongly exothermal course so that it may be advantageous to cool the reaction mixture to −35° C. to −45° C., for example. The reaction products are very easy to work and to isolate. The reaction product is freed from liquid ammonia, decomposed with water, neutralized and dried. The fluorine-containing ethers so obtained are soluble in the usual organic solvents. If polyhydric alcohols are used, the degree of etherification is dependent on the ratio in which the starting materials are employed. The invention accordingly enables the hydroxylic groups of the polyalcohols to be partially or completely etherified by reaction with fluorinated alkylenes. The process of this invention is a single stage method and proceeds very smoothly. The fluorinated ethers obtained constitute, depending on the composition of the starting components and the degree of etherification of the end products, readily movable liquids to highly viscous oils which are in part capable of being distilled under reduced pressure. They may be used, for example, as softeners, lubricants, or auxiliary agents and are, furthermore, valuable organic intermediate products.

The following examples serve to illustrate the invention, but they are not intended to limit it thereto:

*Example 1*

600 grams of pentaerythrite were dissolved in 2 liters of liquid anhydrous ammonia and mixed with 31 grams of sodium dissolved in about 500 cc. of liquid anhydrous ammonia. The alcoholate solution so prepared was then admixed dropwise at −37° C. to −45° C. with 1630 grams of liquid trifluorochloroethylene. After the reaction was complete, the ammonia was rapidly evaporated, and a nearly colorless oil was obtained as a residue. The yield of crude product was 2050 grams. The oil obtained was washed with water and dilute sulfuric acid, taken up in ether, neutralized and dried. The distillation under a reduced pressure of $5.10^{-3}$ mm. of mercury yielded the following fractions:

|  | Grams |
|---|---|
| First runnings, up to 108° C. | 160 |
| Main runnings, 108° C.–118° C. | 1503 |
| Last runnings, 118° C. | 192 |
| Residue | 78 |

All fractions constituted colorless viscous liquids. The following analytical data were found for the main runnings and compared with the corresponding data obtained on the basis of the formula: $C_{11}H_{12}F_9Cl_3O_4$.

Molecular weight calculated _____ 485.5
Molecular weight found _____ [1] 472.0

[1] Measured cryoscopically in benzene.

|  | C | H | F | Cl |
|---|---|---|---|---|
| Calculated for | 27.19 | 2.49 | 35.22 | 22.91 |
| Found | 27.2 | 2.6 | 35.10 | 22.3 |

The compound of the following constitution

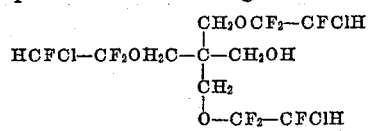

was obtained as main runnings.

*Example 2*

100 grams of sorbitol were dissolved in about 800 cc. of liquid anhydrous ammonia and admixed with 5 grams of sodium in about 200 cc. of liquid anhydrous ammonia. About 120 cc. of liquid trifluorochloroethylene were then added dropwise while stirring at —38° C. to —45° C. After the reaction was complete, the ammonia was rapidly evaporated and a viscous thickly liquid oil was obtained. The crude product was obtained in a yield of 254 grams. It was washed with water and dilute sulfuric acid, taken up in ether and worked up as usual. A viscous oil containing 27.3% of fluorine and 20.3% of chlorine was obtained.

*Example 3*

100 grams of mannitol were dissolved in about 800 cc. of liquid anhydrous ammonia and admixed with 5 grams of sodium dissolved in about 200 cc. of liquid anhydrous ammonia. About 120 cc. of liquid trifluorochloroethylene were then added dropwise while stirring at —37° C. to —45° C. After the reaction was complete; the ammonia was rapidly evaporated and a viscous thickly liquid oil was obtained. The crude product was obtained in a yield of 247 grams. It was worked up as usual and a viscous oil containing 25.4% of fluorine and 20.4% of chlorine was obtained.

*Example 4*

100 grams of glycerol were dissolved in about 800 cc. of liquid anhydrous ammonia and admixed with 6 grams of sodium dissolved in about 200 cc. of liquid anhydrous ammonia. 120 cc. of liquid trifluorochloroethylene were then added dropwise while stirring at —37° C. to —45° C. After the reaction as complete, the reaction product was worked up as usual. A nearly colorless oil containing 33.2% of fluorine and 22.6% of chlorine was obtained as a crude product in a yield of 177 grams.

*Example 5*

100 grams of ethylene glycol were dissolved in about 800 cc. of liquid anhydrous ammonia and admixed with 6 grams of sodium dissolved in about 200 cc. of liquid anhydrous ammonia. 120 cc. of liquid trifluorochloroethylene were then added dropwise while stirring at —37° C. to —45° C. After the reaction was complete, the reaction product was worked up as usual. A nearly colorless oil containing 35.9% of fluorine and 22.4% of chlorine was obtained as a crude product in a yield of 228 grams.

*Example 6*

100 grams of mannitol were dissolved in about 800 cc. of liquid anhydrous ammonia and admixed with 6 grams of sodium dissolved in about 200 cc. of liquid anhydrous ammonia. 100 grams of acrylonitrile were then added for cyanoethylation. The reaction mixture assumed a slightly yellow coloration, and 120 cc. of trifluorochloroethylene were then added dropwise. After the reaction was complete, the reaction product was worked up as usual. A cyanoethylated fluoroether, i.e. a mixed ether, was obtained as a viscous liquid yellow oil in a yield of 281 grams. It contained 15.3% of fluorine, 10.6% of chlorine and 8.2% of nitrogen.

*Example 7*

100 grams of the product of Example 1 were admixed with the exclusion of moisture with 36 grams of vinyl ethyl ether and 3 drops of sulfuryl chloride. The reaction set in after a short while and the temperature of the reaction solution increased to 50° C. To complete the reaction, the solution was boiled for 30 minutes under reflux and worked up as usual. A nearly colorless oil containing 29.3% of fluorine, 18.3% of chlorine, 33.6% of carbon and 4.5% of hydrogen was obtained.

*Example 8*

125 grams of the product obtained in Example 1 was heated to 130° C. while stirring and admixed dropwise with a solution of 18 grams of KOH in 60 cc. of methanol. The methanol was distilled off in the course of the reaction, and a precipitated substance was obtained which consisted substantially of NaF. After 60 to 80 minutes, the reaction was complete yielding the vinyl ethyl ether with evolution of hydrogen halide. The neutral reaction mixture was taken up in ether and worked up as usual. The ether was removed by distillation and a colorless oil was obtained as a residue to which bromine could be added in the presence of ultra-violet light.

The vinyl ethyl ether decomposed slowly on prolonged standing in the air with evolution of hydrogen fluoride. The crude product was obtained in a yield of 107 grams.

*Example 9*

400 grams of tertiary butanol were dissolved in 800 cc. of liquid anhydrous ammonia and admixed with a solution of 15 grams of sodium in 800 cc. of liquid anhydrous ammonia. 520 grams of trifluorochloroethylene were then added dropwise while stirring at —40° C.

The ammonia was rapidly evaporated, the reaction product was taken up in ether, neutralized and dried. The crude product was obtained in a yield of 748 grams. The tertiary ether was distilled at 33° C. under a pressure of 28 mm. of mercury to yield a colorless liquid.

*Analysis.*—Calculated for the Summation formula: $C_6H_{10}F_3C1O$: molecular weight: 190.

|  | C | H | F | Cl |
|---|---|---|---|---|
| Calculated | 37.9 | 5.3 | 30.0 | 18.7 |
| Found | 37.6 | 5.5 | 29.4 | 18.7 |

We claim:

1. The process for the preparation of a fluorine containing chlorinated ether which comprises reacting trifluorochloroethylene in liquid anhydrous ammonia at a temperature between about —70° C. to about 100° C. with an hydroxy-substituted aliphatic hydrocarbon, which hydrocarbon is at least partially soluble as an alcoholate in liquid ammonia, in the presence of at least one basic catalyst selected from the group consisting of an alkali metal alkoxide, an alkaline earth metal, an alkali metal, an alkaline phenolate, an alkaline acetylide, an alkaline amide, and mixtures thereof, said alkali metal having an atomic weight between 6.9 and 133 and said alkaline earth metal having an atomic weight between 40 and 138.

2. The process as in claim 1, wherein the reaction is carried out at atmospheric pressure at a temperature between about —70° C. and about —33° C.

3. The process as in claim 1, wherein said basic catalyst is present in an amount from 1 to 10 percent by weight calculated on the amount of the hydroxy-substituted aliphatic hydrocarbon.

4. The process as claimed in claim 1, wherein pentaerythrite is used as the hydroxy-substituted aliphatic hydrocarbon.

5. The process as claimed in claim 1, wherein tert.-butanol is used as the hydroxy-substituted aliphatic hydrocarbon.

6. The process for the preparation of a compound of the formula

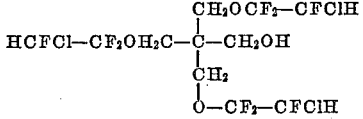

which comprises reacting pentaerythrite with trifluorochloroethylene in the presence of sodium as a catalyst and liquid anhydrous ammonia as a solvent at a temperature between about —70° C. and about —33° C., evaporating the solvent, and recovering the compound by vacuum distillation.

7. The mixtures of addition compounds of one molar part of a polyhydric alcohol selected from the group consisting of sorbitol and mannitol with between about two molar parts of trifluorochloroethylene and up to as many molar parts of trifluorochloroethylene as there are hydroxy groups in said polyhydric alcohol, said polyhydric alcohol and trifluorochloroethylene being reacted in liquid anhydrous ammonia at a temperature between about −70° C. to about 100° C. in the presence of at least one basic catalyst selected from the group consisting of an alkali metal alkoxide, an alkaline earth metal, an alkali metal, an alkaline phenolate, an alkline acetylide, an alkaline amide, and mixtures thereof, said alkali metal having an atomic weight between 6.9 and 133 and said alkaline earth metal having an atomic weight between 40 and 138.

8. The compound of the formula $$CFClH-CF_2-O-CH_2-\underset{\underset{CH_2-O-CF_2-CFClH}{|}}{\overset{\overset{CH_2-O-CF_2-CFClH}{|}}{C}}-CH_2OH$$

References Cited in the file of this patent

UNITED STATES PATENTS 2,409,274   Hanford et al. _____ Oct. 15, 1946